A. H. SHOCK.
AUTOMATICALLY COMPUTING WEIGHING SCALE.
APPLICATION FILED APR. 28, 1909.
952,219.
Patented Mar. 15, 1910.
3 SHEETS—SHEET 1.
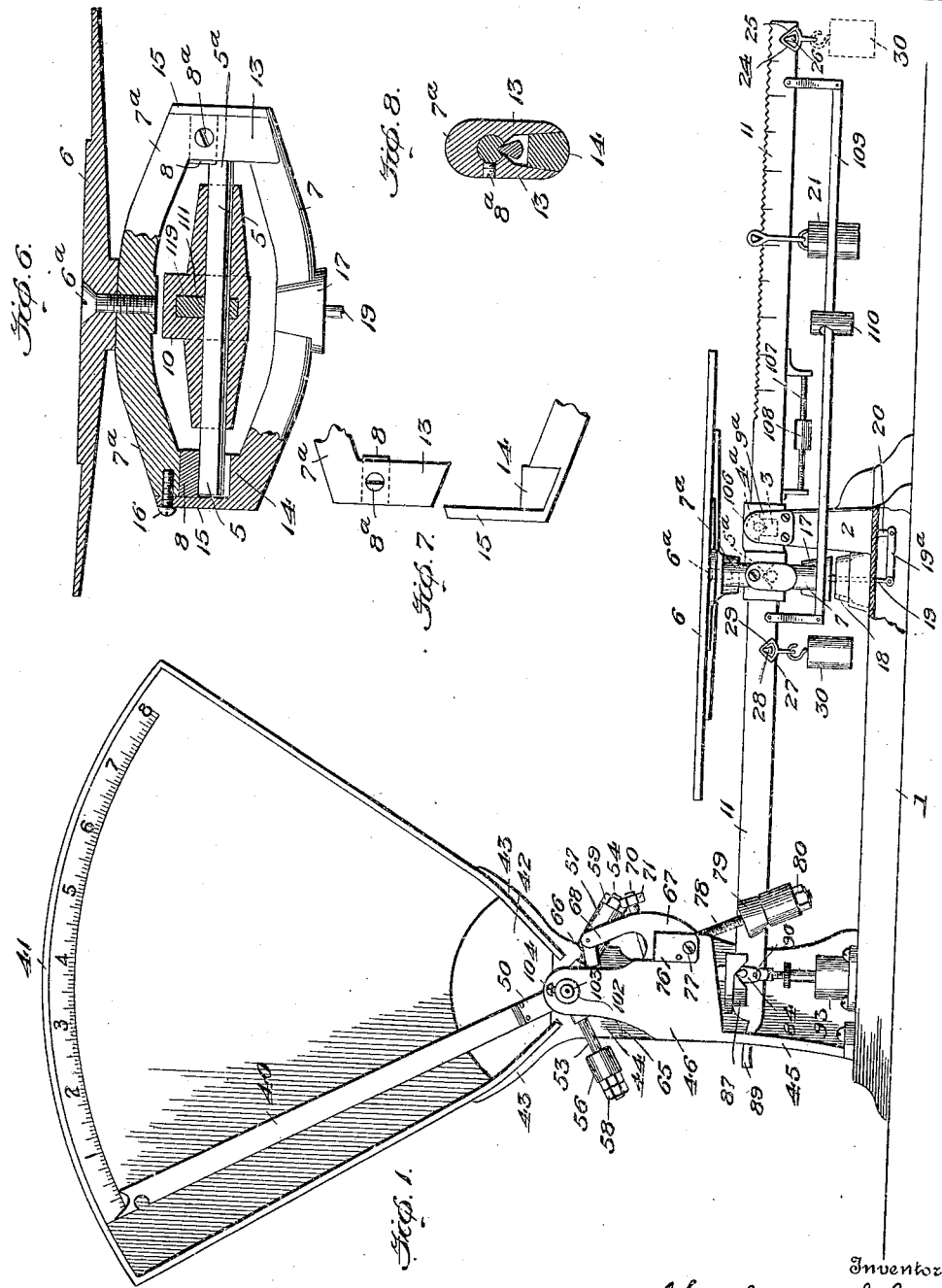
Witnesses
Rose E. Babcock.
Richard E. Babcock.
Inventor
Abraham H Shock,
By
W H Babcock
Attorney

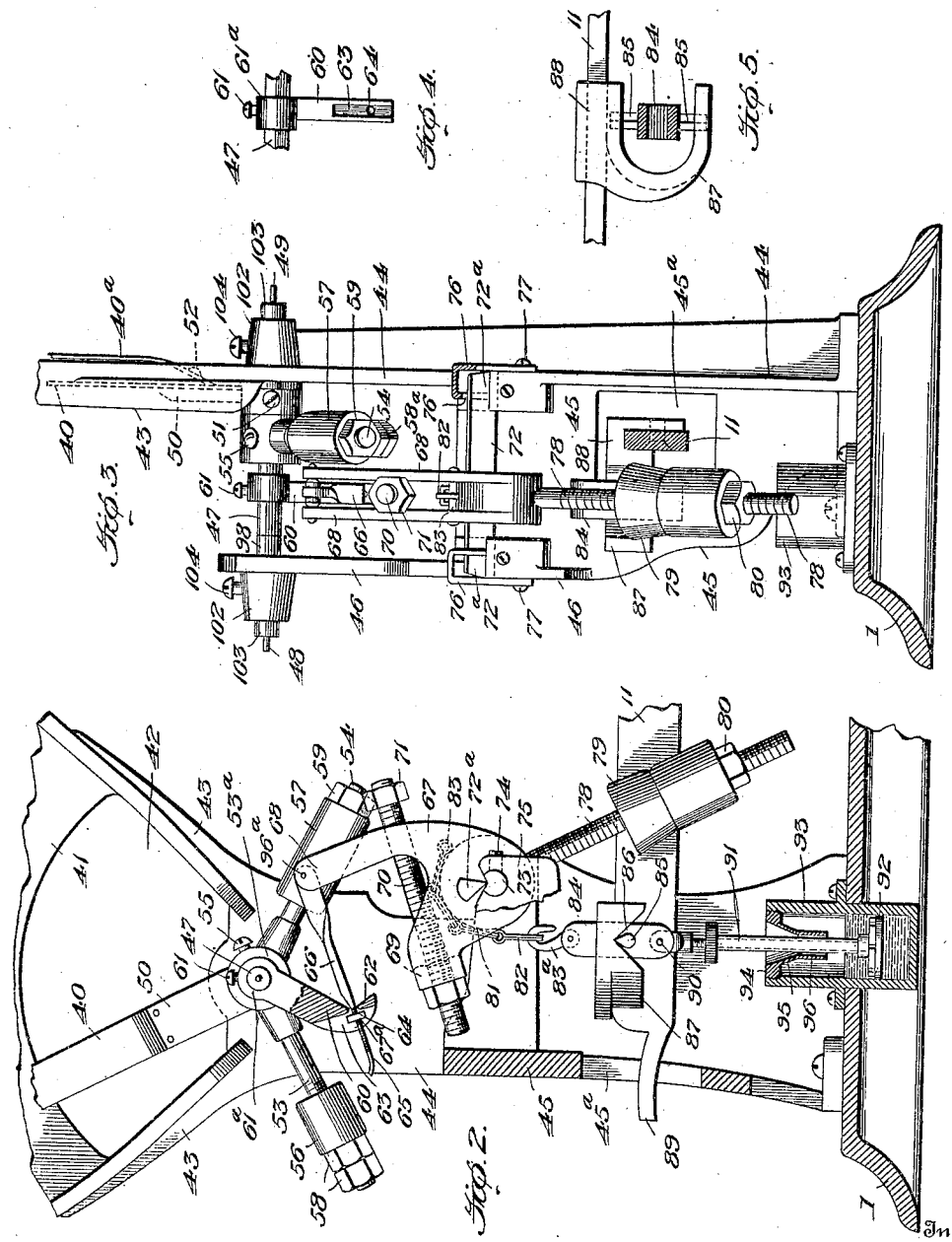

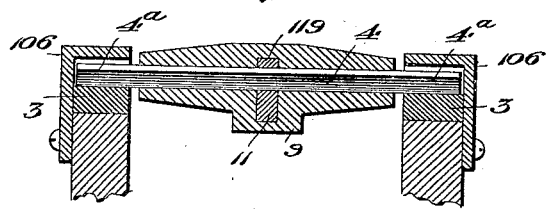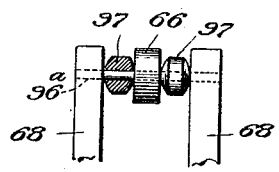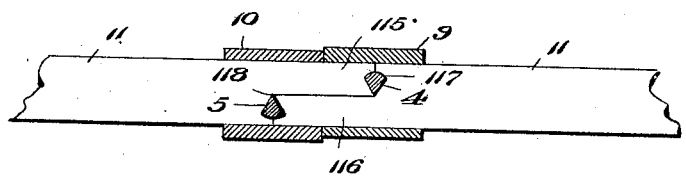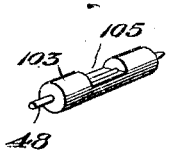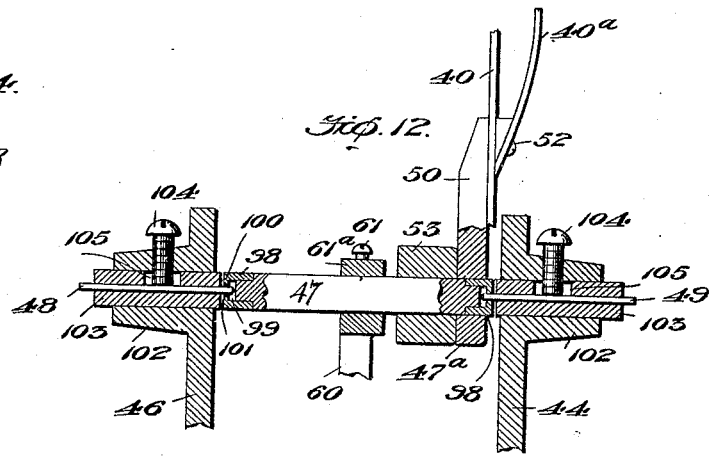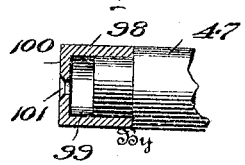

UNITED STATES PATENT OFFICE.

ABRAHAM H. SHOCK, OF LANCASTER, PENNSYLVANIA, ASSIGNOR TO LANCASTER SCALE COMPANY, OF ELIZABETHTOWN, PENNSYLVANIA, A CORPORATION.

AUTOMATICALLY-COMPUTING WEIGHING-SCALE.

952,219.  Specification of Letters Patent.  Patented Mar. 15, 1910.

Application filed April 28, 1909. Serial No. 492,627.

*To all whom it may concern:*

Be it known that I, ABRAHAM H. SHOCK, citizen of the United States, residing at Lancaster, in the county of Lancaster and State of Pennsylvania, have invented certain new and useful Improvements in Automatically-Computing Weighing-Scales; and I do hereby declare the following to be a full, clear, and exact description of the invention, such as will enable others skilled in the art to which it appertains to make and use the same.

This invention relates particularly to automatic price-computing weighing scales, though many of its features are well adapted to weighing scales in general.

The said invention has for its chief objects to attain greater delicacy and accuracy of the pivoting leverage and various adjustments of the mechanism, to increase its durability and efficiency and to improve it in divers details and as a whole.

To these ends the said invention consists in the construction and combination of parts hereinafter more particularly set forth and claimed.

In the accompanying drawings Figure 1 represents a perspective view of the entire weighing mechanism, Fig. 2 represents a side elevation of the mechanism for transmitting motion from the scale-beam to the index, also showing certain proximate parts, some of which are sectioned vertically to exhibit the construction more clearly; Fig. 3 represents an end elevation of such mechanism, the bed plate and scale-beam being sectioned vertically and the index and dial being broken away; Fig. 4 represents a detail elevation of the arm 60, hereinafter described, and certain proximate parts; Fig. 5 represents a detail plan of the casting 87 and proximate parts; Fig. 6 represents a detail view, partly in cross-section, partly in elevation, of the scale-beam, its supporting yoke and attachments; Fig. 7 represents a detail view in elevation of certain end-parts of said yoke; Fig. 8 represents a detail cross-section through one of the end pivots of the pivot-rod 5 in said yoke, its bearings and proximate parts; Fig. 9 represents in elevation the pivot rod 4, the parts in which it fits being shown in vertical section; Fig. 10 represents in detail the bearing rollers 97, and the parts between, and upon which they are placed; Fig. 11 represents in detail side elevation the proximate ends of the scale-beam; the pivots received between them and the inclosing blocks being shown in section; Fig. 12 represents in cross section and partly in elevation, the index-shaft, its pivots, bearings and supports and proximate devices; Fig. 13 represents a detail view of one of the end caps of said shaft, the proximate part of the latter being shown in side elevation, broken away; Fig. 14 represents a detail view of one of the pivot pins or rods for said shaft and the bored and recessed block in which it is mounted. Figs. 2 and 3 are on a larger scale than Fig. 1; the detail views are all on larger scales than Figs. 2 and 3; and, some of the detail views—notably Figs. 10 and 13—on a larger scale than the others; this having been found necessary to make some of the smaller parts distinct while keeping the drawings, as a whole, within reasonable limits.

The bed plate is designated by number 1, having standards 2 raised thereon, in which are set V-shaped agate bearings 3 for the knife edge fulcrum pivots 4ª, consisting of the terminal parts of a transverse integral steel pivot bar 4, having its under side formed into a V-shaped knife edge extending throughout its length. A similar pivot bar 5, having an upwardly presented edge and extended bearing pivots 5ª, supports the scoop small platform or scale-pan 6 by means of a yoke 7, to the upper section 7ª of which said yoke is detachably fastened by a screw 6ª, said yoke section 7ª having steel bearing blocks 8 fastened in it removably by screws 8ª, the under faces of which blocks are V-shaped to fit the knife edge of the pivot bar 5 as presented by its exposed ends 5ª, constituting said bearing pivots. All of pivot bar 4 except the ends or pivots 4ª is incased in a brass block or casting 9, having preferably the form of a nearly rectangular middle piece with two integral wings tapering laterally from it. All of the pivot bar 5 except ends or pivots 5ª is similarly incased in a block or casting 10, which is the counter-part of block 9. The middle parts of these blocks have a central opening 119 for the main scale-beam 11. These blocks may be cast together as one piece, see Fig. 1 9ª on said pivot rods or may be made as two separate blocks, Fig. 11.

The scale-beam 11 consists of two sections arranged end to end, having overlapping tongues 115 and 116 and adapted to form holes 117 and 118, fitting the pivot bars 4 and 5 respectively. If made separate, each block 9 or 10 and its pivot bar 4 or 5 is reversible and interchangeable with the other block and pivot bar, so that the less worn bar may be given the wear and strain of the fulcrum as needed. First one of said tongues, then the other, is passed into the central opening 119 of the block or blocks. If the single block 9ª be used it is turned over end for end interchanging the pivot bars in location and position, the said tongues being then inverted as above. Fastening screws may also be used for the shaft sections and block or blocks.

Heretofore difficulty has often been found in keeping the knife edges of a pair of pivots precisely in line, on account of slight errors in fitting them or unequal yielding in the parts holding them, or accidents affecting them unequally. By making the two pivots in one single rod or bar having a continuous knife edge from end to end, I am enabled to secure and retain exact correspondence in its two ends which serve as pivots and by incasing all the rest of the bar in a solid integral block of metal I brace it effectually against all forms of strain. By making this incasing block of metal having a different expansibility under the heat I compensate for changes of temperature and insure a tight fit between said blocks and said scale-beam. As the rods 4 and 5 are of hard steel, the wear upon the pivots 4ª 5ª is very slight, and the use of agate as bearing material for the fulcrum-pivots 4ª, which bear the chief strain, almost eliminate friction at that point. The said upper section 7ª of yoke or frame 7 has the form of a broad inverted U, the downwardly presented arms 13 of which are bifurcated to straddle the pivots 5ª and blocks 14 of the main part of the frame, to which the number 7 is especially applied. The said bifurcated ends fit against the sides of said blocks and are braced thereby. The lower or main section of this yoke or frame is also provided with raised terminal plates 15, which fit against and cover the outer ends of the bifurcated arms 13 and are attached removably thereto by screws 16. The upper section 7ª of the yoke is thus held rigidly (though detachably) to the main body thereof and braced by the overlapping of blocks 14 by bifurcated arms 13 and of said arms by plates 15, against independent movement at any point, either forward or laterally with respect to the scale beam. This makes a very solid and secure supporting-frame for the scale pan, so that there will be no looseness of parts, said frame being hung as stated by the bearing blocks 8 on the knife edge pivots 5ª with the least possible amount of friction. A conoidal block 17, extending downward from the middle of the frame or yoke 7, rests upon, and forms in appearance the top of, a hollow truncated pedestal 18, which is cast with the plate 1, when the scale pan and yoke or frame 7 are in their lowest position. This block 17, like the blocks 13 and plates 15, is integral with the main or lower section of yoke 7, each of the sections of the latter being preferably a single casting. A rod 19, rigid with said block 17, extends down through the open upper end of said pedestal, and its lower end is connected by a link 19ª, as heretofore known and used, with a rod 20 extending rigidly down from bed plate 1 at a point under the fulcrum of the scale beam. The rod i rises and falls with the scale pan and its supporting yoke in the usual way, the link 19 yielding accordingly and the relatively large opening at the top of hollow pedestal 18 permitting the necessary amount of lateral play, although said rod and pedestal, with said link and fixed rod 20, sufficiently guide said frame in its up and down movements.

The scale beam 11 is notched on its upper side to allow the shifting of the ordinary weight 21 from point to point and is also marked with graduations as usual. The latter is also provided at a point near its end with a yoke or stirrup 24 of U-shape, having in its eyes at its upper ends downwardly presented V-shaped bearings 25 which rest on the upwardly turned knife edge of a straight steel pivot rod 26. On the other side of the fulcrum and scale-pan and near the latter another and similar yoke or stirrup 27 is similarly hung on said main scale beam, having a like pivot-rod 28 and bearings 29. A weight 30, provided, with a suspending hook, is commonly hung on stirrup 27 and then answers the same purpose as the shot or other weights often put in a receptacle suspended under the scale pan or forming part of the latter in steadying said pan, besides partly, counter-balancing the weight 21 to make the beam weigh truly. By shifting this weight 30 to the stirrup 24, without change of the other weights, the machine may be arranged to weigh ten times as much, or in any other prearranged ratio.

The computing finger or index 40 travels over a segmental computing dial, or chart 41, adapted to show the price of the article weighed, by graduations arranged in any suitable denominations as has often heretofore been done. This index is bifurcated to straddle the said chart or dial from below, one fork 40ª of said index passing through an opening 42 in the lower part of said dial up along the rear of the latter, so as to hold the main indicating part of said index near the face of said dial. This opening is between the converging side bars of the sector form metallic dial-frame 43, which frame is rigid and preferably integral with a supporting standard 44, fastened at its base rigidly but detachably to plate 1. A back plate 45, with an opening $45^a$ in its lower part, and a side plate 46 having its lower part cut away are cast in one piece with standard 44, or rigidly attached, to form with said standard a rectangular upright frame open on the side toward the fulcrum of the scale-beam and having parts of them removed whenever they would obstruct the action of the moving parts.

The rock-shaft 47 of the index is journaled on bearing rods 48 and 49, supported respectively in the upper end of standard 44 and the corresponding part of side plate 46, as hereinafter more particularly described. On this index shaft 47 a stout short arm 50 provided with an eye or collar $47^a$ encircling the same is fastened detachably by a screw 51, the latter permitting radial adjustment of said arm and of the said computing index or finger which is fastened thereto. The rear fork $40^a$ of said index is detachably fastened to the main part thereof by a screw 52. Said shaft also carries two weighted screw-threaded arms 53 and 54, which extend obliquely outward and downward in diverse directions, having a collar $53^a$ integral with their converging ends, which collar is fastened on said shaft by a screw 55 detachably and adjustably, as above stated of collar $47^a$. A sleeve-form weight 56, internally threaded is screwed up or down on arm 53 at will to regulate the action of said weight on said rock-shaft and index, a nut or nuts 58 being used to hold said weight in place. In like manner a similar weight 57 is screwed up or down on arm 54, being held by nut or nuts 59. As these weights 56 and 57 counterbalance each other, their relative adjustment by the means shown will suffice to delicately regulate the action of the index in passing over the dial. This rocking index-shaft 47 receives motion through an arm 60, which is adjustably fastened on said shaft by a screw 61, passing through a collar $61^a$ integral with the upper end of said arm. The latter extends obliquely downward and away from the scale pan and scale-beam fulcrum and has its lower part bent, the face 62 of said lower part toward such fulcrum being angular and approximately in the shape of a broad V, whereas the convex opposite face of the lower part of said arm 60 is provided with a longitudinal slot 63. A perforation 64 is made from the middle point of the angle of said face 62 to said slot, flaring from the former to the latter so as to allow play, both laterally and vertically, between arm 60, which receives the impulse and a terminal rigid finger 65 of the arm 66, which gives such impulse. The end of the latter arm on each side of said finger is formed into a knife edge bearing, which fits into said angle of face 62, and said finger extends through said flaring perforations 64 and said slot 63 and is provided beyond the latter with a nut $67^a$ or other detachable head or collar, which will prevent said finger from being drawn back through said perforation and will compel said arm 65 backward as well as forward. The said knife edge and angle may remain in contact with each other and make at all times an anti-friction joint between said parts, or the said nut may be adjusted to allow some movement of the thrusting arm 66 in returning from its operative stroke. The said needle is curved upward at the rear, to facilitate its movement through the perforated arm 60.

The thrusting arm 66 is preferably of steel, twisted for greater strength, and pivoted at its impulse-receiving end to the bifurcated upper part of a rocking frame 67 and between the two curved parallel integral bars 68 thereof. The thrust of said arm is horizontal or at an angle slightly varying therefrom and its position varies from inclination slightly downward to slightly upward, according to the rocking of frame 67. An adjusting screw 70 passes between the said bars thereof and through a nut 69, fixed on the rear ends of another bifurcated part of said frame or integral therewith. Said screw 70 constitutes an adjustable stop determining the extent of movement of frame 67 and consequently of the index in one direction, since the end of said screw will come in contact with the fixed back plate 45 when said frame 67 rocks back far enough, therefore thus regulating the degree of rearward rocking motion permitted to said frame and the forward motion of said index. The said screw is also provided with a nut 71 beyond said frame to prevent detachment, adjusted on said screw to regulate its leverage. Said screw may thus be used as a regulator for the position of the index or finger, somewhat after the manner of regulating a time-piece, and therefore coöperates in function with the two weighted arms on the index shaft. These three devices taken together, make possible the most delicate regulation and adjustment.

The frame 67 has a pivot bar 72 fixed transversely in it substantially the same in construction and arrangement as the fulcrum pivot bar of the main frame but shorter. The part of said frame through which it passes is a solid block, the said frame 67 being preferably cast as one piece of brass on said pivot bar. The pivot ends $72^a$ project therefrom and rest in V-shaped steel bearing blocks 73 detachably held by screws 74 in recessed beds 75, which are integral with standard 44 and side plate 46 parallel and opposite to said standard. Metallic caps 76 for these bearing beds are held detachably thereto by screws 77 and provided with recesses 76ª to fit over the proximate parts of the pivots 72ª constituting parts of integral bar 72. The frame 67 is provided with a screw-threaded rigid rod 78, extending downward and forward (using the latter term to mean in the direction of the fulcrum), on which rod a screw threaded counterbalance weight is adjustable up and down, being held by nuts 79 and 80 in any position to which it may thus be adjusted. Said nuts are respectively above and below said weight on said shaft. This weight acts in opposition to the rear end of the scale beam, and after the latter ceases to act, said weight replaces in their former position the frame 67 the index and all parts which move with them. The rear side of frame 67 is rounded to form a surface 81, approximately constituting the narrow periphery of a wheel formed of the solid main part of said frame and passing between the two bifurcated parts of said frame before described. A chain 82 is attached to a fixed transverse pin 83, which is passed through the two bars 68 of the raised bifurcated rearwardly curved part of said frame above mentioned. Thence said chain passes in contact with said circular surface 81 to the rear thereof and down therefrom to a detachable hook 83ª, pivoted in the bifurcated upper end of a stout link block 84, cast upon or otherwise rigidly attached to the middle part of a pivot-bar or pivot rod 85, the knife edge of which is presented upward and runs from end to end, though, as in the case of the longer bars of this kind, only those parts of the knife edge which are on the parts of said bar projecting from the casting are used for pivoting. These pivot-ends fit into the inverted V-shaped downwardly presented recesses 86 in the underside of the two arms of a U-shaped horizontal bearing casting 87, one of which arms marked 88 is bifurcated on its under side, to straddle the main scale-beam before described. The rear end of said beam is provided with a rearward rigid finger 89, extending through the opening 45ª before mentioned in back plate 45. This finger affords a handle for conveniently lifting said scale-beam out of engagement with the index-operating devices, and may also limit the upward or downward movement of said beam by the contact of said finger with the material of said back plate 45 at the upper end or lower end of said opening. The bifurcated lower end of said link block 84 is provided with a transverse pintle 90, passing through the head of the piston-rod 91 of a piston 92, operating in a dash-pot 93, sunk in bed plate 1 and below it. The upper end of said dash pot has a ring 94 screwed or otherwise secured therein, from which depends a funnel-shaped dash-pot cover 95, which may be integral with said ring and has a tube 96 attached to it extending still farther down within the dash-pot and surrounding the piston rod 91. Hence the oil or other liquid in said dash-pot, when lifted by said piston is stripped by the lower end of said tube from said rod at a point far down in the dash pot, and follows up around said tube and the funnel-shaped part or cover 95 to the top of the dash pot between said part and the side wall, with no opportunity to escape from the pot around the piston-rod.

Certain details of parts already mentioned are important. The pintle 96ª extending across the space between the bars 68 at the upper end thereof, and serving to connect the arm 66 pivotally to said bars 68 of the upper bifurcated end of frame 67ª, is provided on each side thereof with an antifriction roller 97, which is mainly cylindrical, but with convex ends that come in contact respectively with the side of said arm 66 and the proximate bar 68. These rollers serve to fill the spaces between said arm and bars and to reduce the friction incident to any slight twisting motion of the latter.

The rock-shaft 47 which carries the index has at each of its ends a rigidly attached cylindrical part or extension 98, the outer part of which is hollow, forming a chamber 99, closed on the outer side by a thin wall 100, having a central perforation 101, which receives one of the fixed bearing rods 48 or 49 aforesaid. These parts 98, like the rest of the shaft and said rods are of hardened steel, so that there will be no injurious wear, and the thinness of wall 100 presents but a small frictional surface to rock on said rods. Such thinness would be impracticable unless the ends of shaft 47 were in effect shells, as above described. Each rod 48 or 49 has a cylindrical brass block 103 cast or otherwise fixed thereon, said block being set in a tubular lateral extension 102 of said standard 44 or the side wall 46 integral therewith and forming part of the same upright frame. These laterally extending parts 102 are screw tapped to receive clamping screws 104, which turn into recesses 105 formed in said blocks 103, clamping said blocks against turning and also acting as stops to prevent their endwise movement substantially as set forth. The caps covering the ends of the fulcrum pivot bar 4 and the bearings below them are designated 106 and may be of any convenient form. The usual supplemental balance beam attached to the main beam under the same and rocking therewith is marked 107 and carries the usual adjustable weight 108. The tare beam 109 is held laterally and obliquely outward from the main scale beam as shown, and extends in a line parallel thereto, supporting its adjustable weight 110.

The operation of this price-computing weighing scale is necessarily similar in general principle to others of its kind and does not need explaining. When the merchandise depresses the end of the beam nearest to the computing mechanism the index travels over the dial face to show the price. When the weights on the other end of said scale beam are so shifted or increased as to raise the end thus depressed the downward pressure of the latter is relieved so that the index may correspondingly travel back toward its first position, and the continued lifting of said end under such excess of weight or leverage, after the computing mechanism ceases to move back, separates the open downwardly facing bearings carried thereby from the upwardly facing knife edge pivots formed by the small pivot rod or bar set in the link block which is hung by the chain from the rocking frame as before explained. Consequently no strain can be brought on said bearings or link or any other parts by the rising of the proximate end of the scale beam after they have ceased to rise.

Having thus described my invention what I claim as new and desire to secure by Letters Patent is:

1. A fulcrum pivot-bar, having a knife edge from end to end in combination with the scale beam of a pair of weighing scales, through which said bar passes, a block of metal fixed upon said scale-beam and said pivot-bar and incasing all of said pivot bar except its projecting terminal parts, which constitute fulcrum-pivots for said beam, a pair of bearing blocks having upwardly presented V-shaped faces to receive said pivots, means of support for said bearing blocks, into which the latter are set, and caps covering said pivots and bearings substantially as set forth.

2. In combination with a scale beam a block mounted thereon, an integral knife edge bar, extending transversely through said block and beam and projecting at each end beyond said block to present a pair of carrying pivots, a scale-pan-supporting frame, having V-shaped bearings set into its upper part and resting on said pivots and devices yieldingly connecting the said frame to a fixed part below it substantially as set forth.

3. A yoke or frame consisting of two solid castings which overlap at the ends and sides, to prevent the motion of either section either laterally or longitudinally and fit solidly together, said frame being provided internally with bearings and with means for attaching a scale-pan or its equivalent in combination with a scale-beam and pivots carried by said beam, the said bearings fitting on said pivots for carrying said scale pan.

4. A scale-pan-supporting frame, in combination with a scale-beam and carrying pivots mounted in said beam, the said frame consisting of a lower section provided with integral raised blocks and end pieces and the upper section being provided with downwardly extending bifurcated parts, which straddle the blocks and fit against the inner faces of said end-pieces and having also bearings fastened in it, which fit on said pivots for supporting the scale-pan or equivalent device.

5. In combination with a scale-beam, a block fitting thereon, an integral pivot bar, provided with a knife edge from end to end, extending transversely through said beam and block and having its ends protruding from the latter to form carrying pivots, and a scale-pan-carrying frame provided with V-shaped bearing blocks which fit on the said pivots, said frame consisting of two sections, one of which overlaps the other at the sides, the latter section overlapping the former at the ends the said sections being detachably fastened together.

6. A detachable scale-supporting frame, consisting of two sections overlapping both laterally and endwise, in combination with means for detachably fastening them together, a scale pan and means for attaching it to the upper section of said frame, removable bearing blocks and means for holding them to said upper section of the frame, a scale beam passing through said frame, a block on said beam within said frame, and a pivot bar extending transversely through said beam and block and having terminal parts which present knife edges to said bearings and thus serve as carrying pivots for said frame and the scale-pan substantially as set forth.

7. In combination with an index and a shaft carrying the same, two weighted circumferentially adjustable arms, mounted on said shaft and normally opposed in their action, a scale beam and interposed mechanism, whereby said beam rocks said shaft substantially as set forth.

8. A shaft provided at its ends with hollow parts, each of which has a thin terminal wall provided with a central hole, in combination with fixed bearing pins which enter such holes for journaling said shaft, an index carried by said shaft, a scale beam and connections whereby said beam operates said shaft substantially as set forth.

9. A bearing pin in combination with an index shaft journaled at one end thereon, a cylindrical block surrounding said rod and recessed at a point between its ends, a fixed support recessed to receive said block, a screw which works through a part of said support into said recess at will, to hold said block and bearing pin against turning and moving endwise, a scale-beam and means connecting said scale beam with the said index shaft substantially as set forth.

10. In combination with a scale beam and a computing index, a shaft carrying said index, an arm fixed on said shaft and having an angular or V-shaped face, a thrusting arm having a knife edge fitting into the angle of said face and means interposed between said scale-beam and said thrusting arm whereby the latter is forced against the first named arm to rock said shaft substantially as set forth.

11. In combination with a scale beam and a computing index, a shaft carrying said index, an arm on said shaft turning therewith and provided with an opening flaring from the impulse receiving side of said arm to the other side, a thrusting arm bearing with its end against the first named arm and having a finger which passes through said opening, and means interposed between said scale beam and said thrusting arm for giving thrusting motion to the latter as the operating end of the scale beam descends substantially as set forth.

12. A scale-beam and a computing index, in combination with a shaft carrying said index an arm of said shaft moving therewith having a V-shaped face on its impulse-receiving side and its other face slotted and provided with an opening from the central point of the angle of the former face and flaring thence to said slot, a thrusting arm having on its end a knife-edge fitting said angle and a finger extending through said opening and allowed play by the flare thereof, a rocking piece to which said thrusting arm is pivoted and devices interposed between said scale-beam and said rocking piece whereby said beam operates the latter substantially as set forth.

13. A scale beam and a computing index, in combination with a shaft carrying said index an arm attached to and turning with said shaft and having a V-shaped face on one side and a perforation at the middle point thereof extending through to the other side, a thrusting arm having on its end a knife edge fitting into the angle of said V-face and a finger projecting through said perforation, a nut or collar on said finger beyond the arm through which said finger passes in order that said knife edge and V-face may be held in contact and the said arms may move together both ways, a rocking device to which said thrusting arm is pivotally connected and mechanism interposed between said scale-beam and rocking device whereby said beam operates the latter substantially as set forth.

14. A scale beam and a computing index, in combination with a shaft carrying said index, an arm on and moving with said shaft, a thrusting arm acting on the arm first mentioned to rock said shaft, a rocking frame provided with bifurcated arms and a cross-pin carried by said arms, on which pin said thrusting arm is pivotally mounted, a pair of rollers arranged on said pin and having the said thrusting arm between them, said rollers being rounded at both ends or faces to diminish the friction of said thrusting arm and said frame, and devices interposed between said scale-beam and said rocking-frame, whereby the depression of one end of said beam rocks said frame substantially as set forth.

15. In combination with a scale-beam and an index-carrying shaft, mechanism actuated by said beam to rock said shaft and comprising a pivoted arm and a pair of anti-friction rollers, rounded at each end, mounted on the pivot of said arm and interposed between the sides of said arm and proximate parts substantially as set forth.

16. In combination with a scale-beam and a computing index a shaft carrying the latter, an arm of said shaft, a rocking device, an arm pivoted to said device and thrust outward endwise, thereby against the arm first mentioned to transmit rocking motion to said shaft, means interposed between said scale beam and said device whereby the depression of one end of said scale beam rocks said device in one direction and a counterbalance weight attached to said device, which weight tends to rock the latter in the other direction.

17. A scale-beam and a computing index, in combination with a shaft carrying said index and provided with an arm, a rocking frame which carries another arm acting on the former arm to rock said shaft, means interposed between said scale beam and said frame whereby the depression of one end of said scale-beam rocks said frame in one direction, a screw-threaded rod or arm attached to said frame and a counterbalance weight adjustable on said rod and tending to rock said frame in the opposite direction substantially as set forth.

18. In combination with a scale beam and a computing index, a shaft carrying said index, a rocking frame, interlocking attachments of said frame and shaft whereby they rock together in opposite directions, means interposed between said beam and the frame for actuating the latter by the depression of one end of the said beam, a screw passing through said frame from front to rear and a fixed part arranged for contact with said screw whereby said screw becomes an adjustable stop regulating the rearward rocking of said frame and the forward movement of said index.

19. In combination with a scale beam and a computing index a shaft carrying said index, a rocking frame, an arm carried by said frame and an arm on said shaft whereby the motion of the former is transmitted to the latter but in the reverse direction, means interposed between the scale-beam and said frame whereby the depression of one end of said beam rocks the frame in the direction to move forward the index, a counter-balance weight attached to said frame and a part extending rearward through the said frame and serving as an additional regulator for the index.

20. In combination with a scale beam and a computing index, a shaft carrying said index, two oppositely acting, adjustable, counterbalance weights attached to said shaft, a rocking frame, having a convex surface practically forming a wheel, a chain attached to said frame near its front and extending back over said surface and down below said wheel, a device connected to said chain, means carried by said scale beam and acting on said device to draw said chain down as the proximate end of said beam descends, and interlocking arms carried by said frame and shaft whereby the rocking motion of the former causes a reversed rocking motion of the latter substantially as set forth.

21. In combination with a scale beam, a part carried by one end thereof and having downwardly opening pivot-bearings, a device provided with pivots on which said bearings set while the said end of the beam is depressed, a computing index, devices interposed between said pivot bearings and said index and operating the latter by the former, the open construction of said bearings allowing said scale beam to readily free itself from said pivots and rise above them when the weights on the other end of the scale beam are so shifted or increased as to lift the end carrying said open bearings.

22. In combination with a scale beam and a computing index, a shaft carrying said index, a rocking frame, means for operating said frame from said beam, means for operating said shaft from said frame, a fixed frame supporting said rocking frame and said shaft, bearing blocks held in said fixed frame and having V-shaped upward faces and a pivot rod or bar having a knife edge formed on it from end to end, the middle part of said pivot bar being fixed and incased in a solid part of said rocking frame and the ends of said pivot bar forming knife edge pivots for said frame and resting in said V-shaped faces substantially as set forth.

23. In combination with a scale beam and an index, a shaft carrying said index, a device carried by the proximate end of said scale-beam and having V-shaped bearings presented downward, a pivot rod having a knife edge extending along it from end to end, a link block incasing the middle part of said pivot rod, the projecting ends of which form pivots fitting said V-shaped faces, and devices interposed between said block and said shaft, whereby the depression of said block will rock said shaft substantially as set forth.

24. A scale beam consisting of two sections, the proximate ends of which have parts constructed to overlap each other and leave two openings for the pivot bars, in combination with two interchangeable pivot bars and two interchangeable blocks, each fixed on one of said pivot bars, said blocks being adapted to surround said scale beam at the joint and suitable means being provided for fastening said blocks and scale beam sections together substantially as set forth.

25. In combination with a scale beam, a pair of fulcrum bearing blocks, two reversible and interchangeable pivot bars passing through said scale beam, each having a knife edge formed on it from end to end, a pair of supporting bearings in which the ends of one of said bars rest as fulcrum pivots, a pair of bearings resting on the knife edge of the terminal parts of the other pivot bar and a scale-supporting device having the latter bearings fastened therein substantially as set forth.

26. A scale beam consisting of two overlapping sections, in combination with reversible means adapted to fasten them together, and pivot rods respectively embedded at their middle parts in said means, said rods being provided with knife edges extending from end to end of them, one of such edges being presented upward, the other downward, and these pivot rods being reversible with said means and interchangeable substantially as set forth.

In testimony whereof, I have signed my name to this specification in the presence of two subscribing witnesses.

ABRAHAM H. SHOCK.

Witnesses:
S. K. BETNER,
AMOS E. BURKHOLDER.